3,597,406
POLYMERS OF HYDROCARBON SUBSTITUTED
1,5-CYCLOOCTADIENES AND METHODS FOR
THEIR POLYMERIZATION
Nissim Calderon, Akron, Ohio, assignor to The Goodyear Tire & Rubber Company, Akron, Ohio
No Drawing. Continuation-in-part of application Ser. No. 785,032, Dec. 10, 1968, which is a continuation of application Ser. No. 477,035, Aug. 3, 1965, which in turn is a continuation-in-part of application Ser. No. 448,872, Apr. 16, 1965. This application Apr. 30, 1969, Ser. No. 820,632
Int. Cl. C08f 7/02
U.S. Cl. 260—93.1                                     8 Claims

ABSTRACT OF THE DISCLOSURE

There is disclosed a method for the ring opening polymerization of hydrocarbon substituted cyclooctadienes of the formula

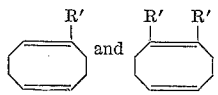

wherein R' is an alkyl, aryl, aralkyl, alkaryl, cycloalkyl or bicycloalkyl radical which comprises polymerizing these hydrocarbon substituted 1,5-cyclooctadienes in the presence of a catalyst system comprising (A) at least one organometallic compound wherein the metal is selected from the group consisting of Ia, IIa, IIb and IIIa of the Periodic Table of Elements, (B) at least one transition metal salt selected from the group consisting of tungsten and molybdenum halides and (C) at least one compound of the general formula R—Y—H wherein Y is oxygen; H is hydrogen and R is a radical selected from the group consisting of (1) hydrogen, (2) alkyl, (3) aryl, (4) arylalkyl, (5) alkaryl, (6) alkenyl, and (7) radicals of (2) through (6) wherein at least one hydrogen of the radical R may be substituted by at least one hydroxyl OH group. Polymers consisting of repeating units having the formula

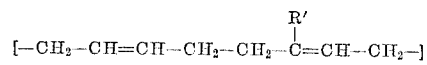

or the formula

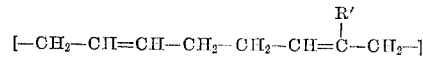

or the formula

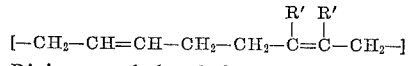

wherein R' is a methyl, ethyl, propyl or butyl radical, are also disclosed.

---

This application is a continuation-in-part of application Ser. No. 785,032, filed Dec. 10, 1968, which is a continuation of application Ser. No. 477,035, filed Aug. 3, 1965, now abandoned, which was in turn a continuation-in-part of application Ser. No. 448,872, filed Apr. 16, 1965, now abandoned.

This invention relates to a process for polymerizing hydrocarbon substituted 1,5-cyclooctadienes and to the perfectly alternating copolymers of butadiene-1,3 and alkyl substituted butadienes resulting therefrom.

The polymerization process of this invention may be used to prepare novel solid elastomeric polymers. The properties and characteristics of these elastomers can be "tailor made" to fit a wide variety of uses and fields of application. The properties of the polymers resulting from the polymerization process of this invention can be varied over a wider range depending on (1) the particular substituted unsaturated alicyclic monomer chosen to be polymerized, (2) the particular polymerization catalyst employed, and (3) the particular polymerization conditions employed. The products resulting from the polymerization of this invention can be employed to produce finished rubber articles, molded goods and the like or they may be materials which are useful to manufacture articles such as films. They may also be employed to form finished products by molding techniques.

Thus, this invention comprises polymerizing at least one hydrocarbon substituted cyclooctadiene selected from the group represented by the formulae:

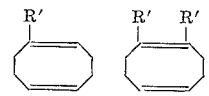

wherein R' is an alkyl, aryl, aralkyl, alkaryl, cycloalkyl or bicycloalkyl radical by subjecting at least one of said hydrocarbon substituted cyclooctadienes to ring opening polymerization conditions in the presence of a catalyst system comprising (A) at least one organometallic compound wherein the metal is selected from the group consisting of Ia, IIa, IIb and IIIa of the Periodic Table of Elements, (B) at least one transition metal salt selected from a group consisting of tungsten or molybdenum halides and (C) at least one compound of the formula R—Y—H wherein Y is oxygen and R is a radical selected from a group consisting of (1) hydrogen, (2) alkyl, (3) aryl, (4) arylalkyl, (5) alkaryl, (6) alkenyl and (7) radicals of (2) through (6) wherein at least one hydrogen of R may be substituted by at least one hydroxyl (OH) group.

The Periodic Table of Elements referred to above may be found in the Handbook of Chemistry and Physics, 44th edition, April 1962 reprinted, page 448, published by The Chemical Publishing Company, Cleveland, Ohio, U.S.A.

This invention also comprises polymers consisting of repeating units of the general formulae:

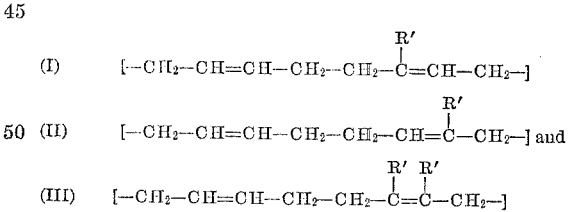

wherein R' is selected from the group of methyl, ethyl, propyl or butyl radicals.

Representative of the hydrocarbon substituted cyclooctadienes useful in this invention are alkyl and dialkyl substituted cyclooctadienes such as 1-methyl, 1-ethyl, 1-propyl, or 1-butyl-1,5-cyclooctadiene; 1,2-dimethyl,1,2-diethyl, 1,2-dipropyl or 1,2-dibutyl-1,5-cyclooctadiene; aryl and diaryl substituted cyclooctadienes such as 1-phenyl-1,5-cyclooctadiene and 1,2-diphenyl-1,5-cyclooctadiene; aralkyl and diaralkyl substituted cyclooctadienes such as 1-tolyl-1,5-cyclooctadiene and 1,2-ditolyl-1,5-cyclooctadiene; alkaryl and dialkaryl substituted cyclooctadienes such as 1-benzyl-1,5-cyclooctadiene and 1,2-dibenzyl-1,5-cyclooctadiene; cycloalkyl and dicycloalkyl substituted-1,5-cyclooctadiene such as 1-cyclopropyl, 1-cyclobutyl, 1-cyclopentyl or 1-cyclohexyl-1,5-cyclooctadiene and 1-,2-dicyclopropyl, 1,2-dicyclobutyl, 1,2-dicyclopentyl or 1,2-dicyclohexyl 1,5-cyclooctadiene; and bicycloalkyl and dibicycloalkyl substituted-1,5-cyclooctadienes such as 1-norbornyl-1,5-cyclooctadiene and 1,2-dinorbornyl-1,5-cyclooctadiene.

Representative examples of metals from which the organometallic compound, the first or (A) component of the catalyst system of this invention, can be derived are lithium, sodium, potassium, rubidium, cesium, beryllium, magnesium, calcium, strontium, barium, zinc, cadmium, aluminum, gallium, indium, and thallium. The preferred organometallic compounds are compounds of lithium, sodium, magnesium, aluminum, zinc and cadmium, with aluminum being most preferred.

Representative examples of organometallic compounds useful as the first or (A) catalyst component of this invention include aluminum compounds having at least one aluminum-carbon bond. Representative of such compounds are trialkylaluminums such as trimethylaluminum, triethylaluminum, tri-n-propylaluminum, tri-n-butylaluminum, triisopropylaluminum, triisobutylaluminum, trihexylaluminum-isopropylaluminum, triisobutylaluminum, trihexylaluminum, trioctylaluminum and the like; triarylaluminums such as tritolylaluminum, tribenzylaluminum, triphenylaluminum and the like; dialkylaluminum halides such as diethylaluminum chloride, di-n-propylaluminum chloride, diisobutylaluminum chloride, diethylaluminum bromide, diethylaluminum iodide, diethylaluminum fluoride and the like; mixtures of dialkylaluminum halides and alkylaluminum dihalides such as ethylaluminum sesquichloride and bromides may also be employed; alkylaluminum dihalides such as ethylaluminum dichloride, ethylaluminum dibromide, propylaluminum dichloride, isobutylaluminum dichloride, ethylaluminum diiodide and the like; dialkylaluminum hydrides such as diethylaluminum hydride, di-n-propylaluminum hydride, diisobutylaluminum hydride and the like; arylaluminum hydrides and dihydrides such as diphenylaluminum hydride and phenylaluminum dihydride; the arylaluminum dihalides such as phenylaluminum dibromide, tolylaluminum dibromide, benzylaluminum dibromide, phenylaluminum diiodide, tolylaluminum diiodide, benzylaluminum diiodide and the like; diarylaluminum halides such as diphenylaluminum chloride, ditolylaluminum chloride, dibenzylaluminum bromide and the like. Other metallic compounds are also useful in the practice of this invention. Representative of such organometallic compounds are organoalkali metal compounds such as alkyllithium compounds such as ethyllithium, n-butyllithium, t-butyllithium and the like; lithium-aluminum-tetraalkyls such as lithium-aluminum-tetrabutyl, lithium-aluminum-tetraethyl and the like; alkali metal alkyls and aryls such as amylsodium, butylpotassium, phenylpotassium, phenylsodium, phenyllithium, butyllithium and the like; magnesium alkyls and aryls such as diphenylmagnesium, diethylmagnesium, ethylmagnesium chloride, phenylmagnesium chloride, butylmagnesium bromide and the like; calcium, strontium, and barium organo compounds such as barium alkyls and aryls; alkyls and aryls of Group IIb metals such as diethylzinc, diphenylzinc, ethylzinc chloride, diethylcadmium, dibutylcadmium and the like; Grignard agents such as phenylmagnesium bromide may also be employed. Mixtures of these compounds may be employed as the first or (A) catalyst component in the catalyst of this invention. It is usually preferred to employ aluminum compounds such as trialkylaluminums, dialkylaluminum halides, alkylaluminum dihalides and aluminumsesquihalides.

Representative examples of the tungsten or molybdenum halides useful as the second or (B) catalyst component of this invention includes such compounds as molybdenum trichloride, molybdenum tetrachloride, molybdenum pentachloride, tungsten dichloride, tungsten tetrachloride, tungsten pentachloride, tungsten hexachloride, molybdenum dibromide, molybdenum tribromide, molybdenum tetrabromide, tungsten dibromide, tungsten pentabromide, tungsten hexabromide, molybdenum hexafluoride, tungsten hexafluoride, tungsten diiodide and tungsten tetraiodide. Of these, it is usually preferred to employ tungsten halides representative of which is tungsten hexachloride.

Representative of the third or (C) catalyst component of this invention are compounds of the formula R—Y—H where Y is oxygen and R is a radical selected from a group consisting of (1) hydrogen, (2) alkyl, (3) aryl, (4) arylalkyl, (5) alkaryl, (6) alkenyl, and (7) radicals of (2) through (6) wherein at least one hydrogen of R may be substituted by at least one hydroxyl (OH) group.

Thus, the formula above defines water (HOH), both saturated and unsaturated alcohols (ROH), hydroperoxides (ROOH) and polyalcohols (HOROH). Representative examples of the compounds corresponding to the formula above are alcohols such as methanol, ethanol, isopropanol, tertiarybutyl alcohol, amyl alcohol, benzyl alcohol, 1,1-dimethylbenzyl alcohol, phenol and the like; the hydroperoxides such as cumyl hydroperoxide, tertiarylbutyl hydroperoxide and the polyalcohols such as ethylene glycol, glycerol and similar polyglycols such as cathechol, resorcinol, hydroquinone, pyrogallol and the like. The preferred compounds of the general formula

R—Y—H are the saturated alcohols represented by methanol, ethanol, isopropanol, tertiarylbutyl alcohol and amyl alcohol. The most preferred compound is the saturated alcohol ethanol.

The catalysts employed in this invention are prepared by mixing the components by known techniques. Thus, the catalysts may be prepared by "preformed" or "in situ" techniques. By the "preformed" method the catalyst components are mixed together prior to exposure of any of the catalyst components to the monomer to be polymerized. In the "in situ" method, the catalyst components are added separately to the monomer to be polymerized. The catalyst components may be mixed either as pure compounds or as suspensions or solutions in liquids which do not adversely affect polymerization.

While the presence of the monomer is not essential during the formation of active catalyst by a mixing of components B and C and this fact facilitates the use of "preformed" catalysts, it has been found that freshly preformed catalysts are generally more active than catalysts which have been allowed to age before use.

It has been found that good results are obtained in the practice of this invention when the molar relationship between the catalyst components A and B as previously defined are within a molar ratio of $A/B$ ranging from about 0.5/1 to at least about 15/1. A more preferred molar ratio of $A/B$ is about 0.5/1 to 8/1. A still more preferred molar ratio is about 0.75/1 to about 5/1.

The amount of catalyst employed in the polymerizations of this invention may be varied over wide concentrations and has not been found to be critical. Of course, a catalytic amount of the catalyst must be employed. The optimum amount of catalyst depends on a number of factors such as temperature, reactants used, purity of reactants, reaction times desired and the like. Those skilled in the art will readily determine the optimum catalytic ranges. Polymerizations can be conducted wherein the amount of catalyst employed is about 0.01 part by weight of B per 100 parts by weight of monomer employed with component A adjusted to yield a desirable atomic ratio of A to B.

The polymerizations of this invention may be conducted in solution. When the polymerization is carried out in solution, solvents which do not adversely affect the polymerization are desired. Representative examples of useful solvents include liquid aromatic hydrocarbons such as benzene and toluene; hydrogenated aromatic hydrocarbons such as tetralin; liquid aliphatic hydrocarbons such as pentane, heptane, hexane, petroleum ether, decane; and alicyclic hydrocarbons such as cyclohexane, decaline and cyclooctane. Mixtures of such solvents may also be used.

Temperatures at which the polymerization reaction is carried out can be varied over a wide range. Usually the temperature can be varied from extremely low temperatures such as −60° C. up to high temperatures such as 150° C. or higher. Thus, the temperature is not a critical factor of the invention. It is generally preferred, however, to conduct the reaction at a temperature in the range of from about −20° C. to about 80° C. The pressure at which the polymerization is carried out can also be varied over a wide range. The reaction can be conducted at atmospheric pressure or, if desired, it can be carried out at sub-atmospheric pressure or super-atmospheric pressure. Generally, a satisfactory polymerization is obtained when the reaction is carried out at about autogeneous pressure developed by the reactants under the operating conditions used.

The polymerization time will vary and can range from a few seconds to 24 hours or more, depending upon the polymerization conditions and the degree and extent of polymerization desired.

The polymerization reaction may be carried out as a batch or as a continuous process. In performing the polymerizations of this invention, the introduction of the monomer, catalyst and solvent, when a solvent is employed, can each be made to the reaction zone alternately, intermittently and/or continuously.

The polymerizations of this invention take place through a ring opening polymerization mechanism. Such ring opening polymerization of certain sustituted unsaturated alicyclic compounds leads to interesting copolymers.

Thus, the polymers defined previously by Formula I consisting of perfectly alternating copolymers of butadiene-1,3 and 2-methyl-butadiene-1,3 (isoprene); butadiene-1,3 and 2-ethyl-butadiene - 1,3; butadiene-1,3 and 2-propyl-butadiene-1,3; and butadiene-1,3 and 2-butyl-butadiene-1,3 wherein each of the monomers in the copolymer are in a 1,4 configuration and a head-to-tail relationship.

The copolymers defined previously by Formula II consist of perfectly alternating copolymers of identical monomers as does (I), wherein each of the monomers in the copolymers are in a 1,4 configuration and in a head-to-head or tail-to-tail relationship.

The polymers defined previously by (III) consist of alternating copolymers of butadiene-1,3 and 2,3-dimethyl-butadiene - 1,3; butadiene-1,3 and 2,3-diethyl-butadiene-1,3; butadiene-1,3 and 2,3-dipropyl-butadiene-1,3 and butadiene-1,3 and 2,3-dibutyl-butadiene-1,3 wherein each of the monomers in the copolymer are in the 1,4 configuration and either head-to-tail or tail-to-tail or head-to-head relationship.

In these applications the monomer may be polymerized in the presence of one or more reinforcing carbon blacks, pigments or resins and certain antioxidants. The products made by this procedure may be crosslinked by adding polymerizable polyfunctional compounds, for example, bicyclopentadiene, to the main monomer. The molded products made by ring-opening polymerization may be crosslinked by exposure to ionizing radiation such as gamma rays, X-rays, or electrons. These molded products may also be crosslinked or vulcanized by incorporating certain compounds which, on heating during or subsequent to the polymerization, will lead to conventional crosslinking or vulcanization of these polymers.

The polymerization reaction may be terminated by incorporating various compounds which, upon heating, release materials which deactivate the catalyst. Representative examples of such compounds are the ammonia salts such as ammonium chloride, ammonium carbonate, ammonium acetate, ammonium oleate, ammonium sulphate and ammonium phosphate; other ammonia-releasing compounds such as tetraalkyl ammonium halides, e.g., tetramethyl ammonium chloride; water-releasing agents such as salts with water of crystallization, examples of which are:

$Al_2(SO_4) \cdot 17H_2O$; $NH_4Al(SO_4)_2 \cdot 12H_2O$; $FeSO_4 \cdot 7H_2O$; $MgHPO_4 \cdot 7H_2O$; $KAl(SO_4)_2 \cdot 12H_2O$; $KNaCO_3 \cdot 6H_2O$; $Na_2B_4O_7 \cdot 10H_2O$; $Na_2CO_3 \cdot 10H_2O$; $NaHPO_4 \cdot 12H_2O$; $Na_2SO_4 \cdot 10H_2O$; and $ZnNO_3 \cdot 6H_2O$.

The following examples are set forth to illustrate the nature of this invention. It should be understood that these examples are illustrative and not limitative. All parts and percentages are by weight unless otherwise indicated. All experiments are conducted in an atmosphere of nitrogen unless otherwise noted.

EXAMPLE I

A solution of 1-methyl-1,5-cyclooctadiene in the amount of 7.12 grams was formed by mixing with 8.0 milliliters (ml.) of dry benzene. This solution was treated with 0.6 ml. of a 0.05 molar (M) tungsten hexachloride-ethyl alcohol solution which had been made up at a tungsten/oxygen (W/O) mole ratio of 1/1 in benzene, followed by 0.7 ml. of a 0.2 M solution of ethylaluminum dichloride (EADC) in benzene. After allowing this mixture to react 30 minutes at room temperature, the polymerization was shortstopped by the addition of a large excess of methyl alcohol. The polymer which was obtained was purified by dissolving in and precipitating from benzene three times, using methanol as a precipitating medium. After drying, 5.62 grams of solid polymer was obtained indicating a yield of 79%.

This polymer was found to have an inherent viscosity in benzene at 25° C. of 0.55 deciliter per gram. A Nuclear Magnetic Resonance analysis of this polymer indicated the presence of 50:50±1 % (the accuracy of the measurement) of 1,4 polybutadiene and 1,4 polyisoprene units which is consistent with the structure.

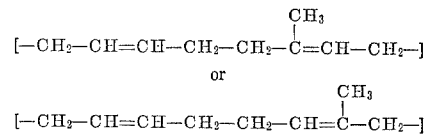

or mixtures thereof.

The infrared analysis of this polymer indicates a mixture of cis 1,4 and trans 1,4 polybutadiene units present in the butadiene content of the polymer. The presence of cis 1,4 polyisoprene units was confirmed by the band at 830 centimeters$^{-1}$. The glass transition temperature of this perfectly alternating butadiene-isoprene copolymer was found to be −85° C. by the differential thermal analysis method.

EXAMPLE II

Freshly distilled 1-ethyl-1,5-cyclooctadiene in the amount of 3.36 grams was treated with 0.2 milliliter of a 0.05 molar of tungsten hexachloride-ethanol solution at a 1/1 mole ratio of W/O in benzene, followed immediately by 0.10 ml. of a 0.2 M solution of ethylaluminum dichloride in benzene. The polymerization was terminated with an excess of methanol after two minutes at room temperature. The polymer was isolated and purified by a similar procedure as that of Example I. A 67% conversion was obtained as indicated by 2.25 grams of solid polymer.

This polymer was found to have an inherent viscosity in benzene at 25° C. of 0.94 deciliter per gram. An infrared analysis indicated that the presence of cis 1,4 and trans 1,4 butadiene structures and the presence of 2-ethyl butadiene structures were confirmed by the presence of a strong band at 840 centimeters$^{-1}$ which represents the

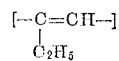

Thus, the polymer contains repeating units of the formula:

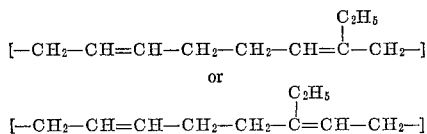

or mixtures thereof.

These examples indicate that it is possible to produce perfectly alternating copolymers consisting of repeating units of the general formulae:

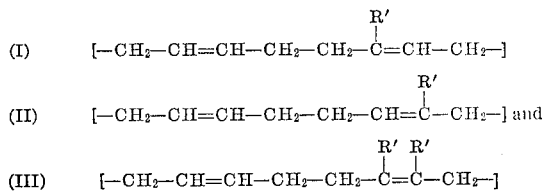

wherein R' is selected from the group of methyl, ethyl, propyl and butyl radicals.

While certain representative embodiments and details have been shown for the purpose of illustrating the invention, it will be apparent to those skilled in this art that various changes and modifications may be made therein without departing from the spirit or scope of the invention.

What is claimed is:

1. A polymerization process which comprises polymerizing at least one hydrocarbon substituted 1,5-cyclooctadiene of the formulae:

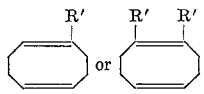

wherein R' is an alkyl, aryl, aralkyl, cycloalkyl or bicycloalkyl radical, in the presence of a catalyst system comprising (A) at least one organometallic compound wherein the metal is selected from the group consisting of Ia, IIa, IIb and IIIa of the Periodic Table of Elements, (B) at least one transition metal salt selected from the group consisting of tungsten and molybdenum halides and (C) at least one compound of the general formula R—Y—H wherein Y is oxygen; H is hydrogen and R is a radical selected from the group consisting of (1) hydrogen, (2) alkyl, (3) aryl, (4) arylalkyl, (5) alkaryl, (6) alkenyl, and (7) radicals of (2) through (6) wherein at least one hydrogen of the radical R may be substituted by at least one hydroxyl (OH) group.

2. The process according to claim 1 in which the hydrocarbon substituted 1,5-cyclooctadiene is of the formula

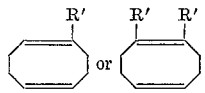

wherein R' is a methyl, ethyl, propyl or butyl radical.

3. A process according to claim 1 in which the molar relationship between the two catalyst components defined by A and B are within a molar ratio of A/B ranging from about 0.5/1 to at least 15/1.

4. A process according to claim 1 in which the (A) organometallic catalyst component is an organoaluminum compound, the (B) catalyst component is a tungsten halide and the (C) catalyst component is a saturated aliphatic alcohol.

5. A process according to claim 1 in which the polymerization is conducted in solution.

6. A process according to claim 2 wherein the molar ratio of (A)/(B) ranges from about 0.5/1 to about 8/1.

7. Polymers consisting of alternating repeating units of the general formulae:

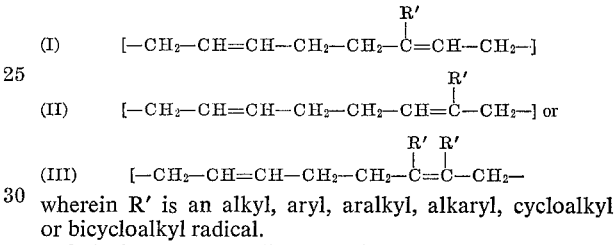

wherein R' is an alkyl, aryl, aralkyl, alkaryl, cycloalkyl or bicycloalkyl radical.

8. Polymers according to claim 7 in which R' is a methyl, ethyl, propyl or butyl radical.

References Cited

UNITED STATES PATENTS

| | | | |
|---|---|---|---|
| 2,913,444 | 11/1959 | Diem | 260—94.2 |
| 3,147,237 | 9/1964 | Longiave | 260—82.1 |
| 3,347,839 | 1/1967 | Lasis | 260—94.3 |
| 3,026,269 | 3/1962 | Gresham et al. | 252—429 |
| 3,161,628 | 12/1964 | Dost et al. | 260—94.9 |
| 3,459,725 | 8/1969 | Natta et al. | 260—93.1 |
| 3,163,611 | 12/1964 | Anderson et al. | 252—429 |
| 3,449,310 | 6/1969 | Dall' Astal et al. | 260—93.1 |

JOSEPH L. SCHOFER, Primary Examiner

R. A. GAITHER, Assistant Examiner

U.S. Cl. X.R.

260—82.1